United States Patent
Gaither et al.

(10) Patent No.: US 11,560,053 B2
(45) Date of Patent: Jan. 24, 2023

(54) ELECTRIC VEHICLE COMPRISING A VERTICAL ELECTRIC PROPULSION MOTOR AND METHOD OF MAKING AND USING THE SAME

(71) Applicant: Toyota Motor Engineering & Manufacturing North America, Inc., Plano, TX (US)

(72) Inventors: Geoffrey David Gaither, Brighton, MI (US); Robert C. MacArthur, Ypsilanti, MI (US); Justin J. Chow, Los Angeles, CA (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 566 days.

(21) Appl. No.: 16/591,726

(22) Filed: Oct. 3, 2019

(65) Prior Publication Data

US 2021/0101479 A1     Apr. 8, 2021

(51) Int. Cl.
*B60K 17/356*     (2006.01)
*B60K 17/04*     (2006.01)
(Continued)

(52) U.S. Cl.
CPC ............ *B60K 17/356* (2013.01); *B60G 13/18* (2013.01); *B60K 1/02* (2013.01); *B60K 7/0007* (2013.01);
(Continued)

(58) Field of Classification Search
CPC .. B60K 7/0007; B60K 17/356; B60K 17/043; B60K 17/20; B60K 17/346; B60K 1/02;
(Continued)

(56) References Cited

U.S. PATENT DOCUMENTS 1,543,044 A     6/1925   Anglada
3,469,648 A     9/1969   Cannon
(Continued)

FOREIGN PATENT DOCUMENTS

FR       3021257 A1    11/2015
WO      199709192      3/1997
(Continued)

OTHER PUBLICATIONS

Eric Adams, "The Secrets of Electric Cars and Their Motors: It's Not All About the Battery, Folks," Jan. 9, 2018, pp. 1-11, found at https://www.thedrive.com/tech/17505/the-secrets-of-electric-cars-and-their-motors-its-not-all-about-the-battery-folks.

*Primary Examiner* — Erez Gurari

(74) *Attorney, Agent, or Firm* — Christopher G. Darrow; Darrow Mustafa PC

(57) ABSTRACT

An electric vehicle comprises a vehicle chassis extending along a longitudinal axis and a rotatable vehicle drive axle disposed along a transverse axis and having opposed ends that are configured for attachment to a pair of opposed drive wheels. The electric vehicle also comprises a selectively movable electric propulsion motor comprising a rotatable motor shaft rotatable about a motor axis, the electric propulsion motor configured to be mounted within the vehicle chassis and operatively coupled to the rotatable vehicle drive axle and opposed drive wheels, the motor axis configured to be oriented in a substantially vertical direction.

20 Claims, 10 Drawing Sheets

(51) Int. Cl.
| | |
|---|---|
| *B60K 7/00* | (2006.01) |
| *B60K 11/08* | (2006.01) |
| *B60K 11/06* | (2006.01) |
| *B60K 17/16* | (2006.01) |
| *B60K 17/346* | (2006.01) |
| *B60G 13/18* | (2006.01) |
| *B60L 50/51* | (2019.01) |
| *B60L 50/52* | (2019.01) |
| *B60L 50/60* | (2019.01) |
| *B62D 65/10* | (2006.01) |
| *B60K 1/02* | (2006.01) |
| *B60K 1/00* | (2006.01) |

(52) U.S. Cl.
CPC ............ *B60K 11/06* (2013.01); *B60K 11/085* (2013.01); *B60K 17/043* (2013.01); *B60K 17/20* (2013.01); *B60K 17/346* (2013.01); *B60L 50/51* (2019.02); *B60L 50/52* (2019.02); *B60L 50/60* (2019.02); *B62D 65/10* (2013.01); *B60G 2300/50* (2013.01); *B60G 2600/60* (2013.01); *B60K 2001/006* (2013.01); *B60K 2007/0038* (2013.01); *B60K 2007/0084* (2013.01)

(58) Field of Classification Search
CPC ................. B60K 11/06; B60K 11/085; B60K 2001/006; B60K 2007/0038; B60K 2007/0084; B60G 13/18; B60G 2300/50; B60G 2600/60; B60L 50/51; B60L 50/52; B62D 65/10

See application file for complete search history.

(56) References Cited

U.S. PATENT DOCUMENTS

| | | | | |
|---|---|---|---|---|
| 4,089,384 | A * | 5/1978 | Ehrenberg | ............ B60G 15/06 180/65.265 |
| 4,802,542 | A * | 2/1989 | Houston | ............ A61G 5/1051 297/DIG. 10 |
| 5,356,337 | A | 10/1994 | Dauvergne | |
| 5,558,174 | A * | 9/1996 | Avitan | ................ B66F 9/07595 74/420 |
| 6,276,474 | B1 | 8/2001 | Ruppert et al. | |
| 6,491,127 | B1 * | 12/2002 | Holmberg | ............... B62D 7/026 301/6.5 |
| 6,854,555 | B2 | 2/2005 | Raue | |
| 6,913,102 | B2 | 7/2005 | Sugata et al. | |
| 7,134,517 | B1 * | 11/2006 | Kaiser | ................ B60K 17/356 180/65.6 |
| 7,410,017 | B2 * | 8/2008 | Gradu | ................. B60K 17/145 180/65.6 |
| 7,621,360 | B2 | 11/2009 | Stübner et al. | |
| 7,854,674 | B2 | 12/2010 | Freudenreich | |
| 7,870,918 | B2 * | 1/2011 | Muller | ................... B60G 15/07 180/65.51 |
| 8,858,379 | B2 | 10/2014 | Keeney et al. | |
| 9,212,599 | B2 | 12/2015 | Gao et al. | |
| 9,266,705 | B2 | 2/2016 | Kanna et al. | |
| 9,317,039 | B2 | 4/2016 | Araki et al. | |
| 9,533,672 | B2 | 1/2017 | Christ | |
| 9,550,406 | B2 | 1/2017 | Chen et al. | |
| 9,604,533 | B2 | 3/2017 | Itoh | |
| 9,616,743 | B1 | 4/2017 | Mays et al. | |
| 9,707,822 | B2 | 7/2017 | Cheng | |
| 9,914,348 | B2 | 3/2018 | Koval et al. | |
| 10,017,047 | B2 | 7/2018 | Dudar | |
| 10,396,631 | B2 | 8/2019 | Herb | |
| 11,066,090 | B2 * | 7/2021 | Johnson | ................. B60B 33/00 |
| 2001/0011611 | A1 | 8/2001 | Poerschmann | |
| 2002/0110452 | A1 | 8/2002 | Jurado et al. | |
| 2003/0006084 | A1 * | 1/2003 | Raue | ........................ B60L 50/52 180/337 |
| 2003/0116313 | A1 | 6/2003 | O'Donnell | |
| 2003/0155163 | A1 * | 8/2003 | Sugata | ................. B62D 7/1509 180/199 |
| 2003/0226653 | A1 | 12/2003 | Takedomi et al. | |
| 2006/0173590 | A1 | 8/2006 | Zillmer et al. | |
| 2008/0190677 | A1 * | 8/2008 | Muller | ..................... B60L 15/20 180/65.51 |
| 2010/0025131 | A1 | 2/2010 | Gloceri et al. | |
| 2010/0155168 | A1 * | 6/2010 | Mies | ........................ B60K 7/0007 180/300 |
| 2011/0204149 | A1 | 8/2011 | Prior | |
| 2011/0259657 | A1 | 10/2011 | Fuechtner | |
| 2012/0049664 | A1 | 3/2012 | Yokoyama et al. | |
| 2012/0159916 | A1 * | 6/2012 | Ishii | ........................ B60L 1/003 56/10.2 G |
| 2013/0178320 | A1 | 7/2013 | Suzuki et al. | |
| 2015/0060160 | A1 | 3/2015 | Kerschl et al. | |
| 2016/0311310 | A1 | 10/2016 | Muenst | |
| 2017/0253144 | A1 | 9/2017 | Arima et al. | |
| 2018/0264929 | A1 * | 9/2018 | Tamura | ..................... B60K 7/00 |
| 2018/0339583 | A1 * | 11/2018 | Hirai | ..................... B60K 11/04 |
| 2019/0009679 | A1 | 1/2019 | Gaither et al. | |
| 2019/0131851 | A1 * | 5/2019 | Herb | ..................... H02K 11/33 |
| 2019/0176618 | A1 * | 6/2019 | Bassis | ..................... B60K 1/02 |
| 2019/0248233 | A1 * | 8/2019 | Calleija | ..................... B60B 37/10 |
| 2020/0398882 | A1 * | 12/2020 | White | ..................... B60K 7/0007 |
| 2021/0101471 | A1 * | 4/2021 | Gaither | ................ B60K 17/356 |
| 2021/0101477 | A1 * | 4/2021 | Gaither | ..................... B60K 6/46 |
| 2021/0101479 | A1 * | 4/2021 | Gaither | ..................... B60G 13/18 |
| 2021/0101480 | A1 * | 4/2021 | Gaither | ..................... B60K 6/48 |

FOREIGN PATENT DOCUMENTS

| | | |
|---|---|---|
| WO | 2010046905 A1 | 4/2010 |
| WO | 2011118266 A1 | 9/2011 |
| WO | 2016063515 A1 | 4/2016 |
| WO | 2018163765 A1 | 9/2018 |

\* cited by examiner

ELECTRIC VEHICLE COMPRISING A VERTICAL ELECTRIC PROPULSION MOTOR AND METHOD OF MAKING AND USING THE SAME

FIELD OF THE INVENTION

The embodiments disclosed herein relate generally to an electric vehicle comprising an electric propulsion motor and a motor axis configured for mounting in a substantially vertical direction, including a fully vertical direction, and a method of making and using the vehicle. More particularly, it relates to an electric vehicle comprising a movable electric propulsion motor and a motor axis configured for mounting in a substantially vertical direction, including a fully vertical direction, and movable from a first position and a first direction of the motor axis to a second position and a second direction of the motor axis, and a method of making and using the vehicle.

BACKGROUND

Thermal management for electric powered vehicles (EVs) comprising electric propulsion motors has a direct influence on driving range and vehicle efficiency. The electric propulsion motors, also referred to electric machines or e-machines, produce heat when they are operated. As the electric motor temperatures rises, the motor efficiency decreases reducing the vehicle driving range and the overall vehicle efficiency. Therefore, effective thermal management of EV motors is a very important design consideration.

Current EV designs position the electric propulsion motors in the same horizontal plane as the drive wheels in nearly all applications. The electric propulsion motors are mounted in fixed positions in the EV with the motor axis oriented longitudinally or transversely in the vehicle in a horizontal plane defined by the EV drive wheels.

The current positioning of the electric propulsion motors is not ideal for cooling because many suspension, chassis, and body components block a direct path for cooling air intake from the front of the vehicle thereby necessitating the use of other cooling systems. A direct path for air cooling is very desirable because an amount of air cooling is generally available when the EV is in motion with minimal, or in some case no, reduction in vehicle efficiency.

Furthermore, as illustrated in FIG. 9, the prior art horizontal positioning of the electric propulsion motors 32' and motor shafts 34' with their horizontal motor axes 36' results in the motor torque (T') being applied in a substantially vertical plane, which is the same vertical plane in which the vehicle suspension operates. As such, torques generated by operation of the electric propulsion motors act on and affect the suspension 98' and the sprung masses of the vehicle chassis that are supported thereon. Therefore, operation of the electric propulsion motor or motors 32' may result in forces acting on the suspension that are perceptible by the vehicle operator and passengers and that are generally very undesirable. In fact, prior art electric vehicles have included various systems and methods of operation that are designed to reduce or mask these forces.

In view of the above, it is desirable to provide EVs with electric propulsion motors in an orientation that provides more ideal air cooling to improve vehicle driving range and the overall vehicle efficiency as well as providing other synergistic benefits to vehicle operation. It is also desirable to provide electric vehicles and electric propulsion motors that do not produce forces acting on the suspension that are perceptible by the vehicle operator and passengers.

SUMMARY OF THE INVENTION

In one embodiment, an electric vehicle is disclosed. The electric vehicle comprises a vehicle chassis extending along a longitudinal axis and a rotatable vehicle drive axle disposed along a transverse axis and having opposed ends that are configured for attachment to a pair of opposed drive wheels. The electric vehicle also comprises a selectively movable electric propulsion motor comprising a rotatable motor shaft rotatable about a motor axis, the selectively movable electric propulsion motor configured to be mounted within the vehicle chassis and operatively coupled to the rotatable vehicle drive axle and the opposed drive wheels, the selectively movable electric propulsion motor and the motor axis configured to be oriented in a substantially vertical direction and movable with reference to the rotatable vehicle drive axle.

In another embodiment, a method of making an electric vehicle is disclosed. The method of making the electric vehicle comprises forming a vehicle chassis extending along a longitudinal axis and a rotatable vehicle drive axle disposed along a transverse axis and having opposed ends that are configured for attachment to a pair of opposed drive wheels. The method of making also comprises mounting a selectively movable electric propulsion motor within the vehicle chassis comprising a rotatable motor shaft rotatable about a motor axis, the selectively movable electric propulsion motor coupled to the rotatable vehicle drive axle and the opposed drive wheels, the motor axis configured to be oriented in a substantially vertical direction.

In yet another embodiment, a method of using an electric vehicle is disclosed. The method of using the electric vehicle comprises forming the electric vehicle comprising a vehicle chassis extending along a longitudinal axis and a rotatable vehicle drive axle disposed along a transverse axis and having opposed ends that are configured for attachment to a pair of opposed drive wheels, and a selectively movable electric propulsion motor comprising a rotatable motor shaft rotatable about a motor axis, the selectively movable electric propulsion motor configured to be mounted within the vehicle chassis and operatively coupled to the rotatable vehicle drive axle and opposed drive wheels, the motor axis configured to be oriented in a substantially vertical direction, the selectively movable electric propulsion motor and the motor axis also configured to be selectively movable while the electric vehicle is stationary or in motion from a first position comprising a first direction of the motor axis to a second position comprising a second direction of the motor axis, the second position being separated from the first position by an angle ($\alpha$). The method of using also comprises operating the electric vehicle and moving the selectively movable electric propulsion motor from the first position to the second position while the electric vehicle is operating.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 9:
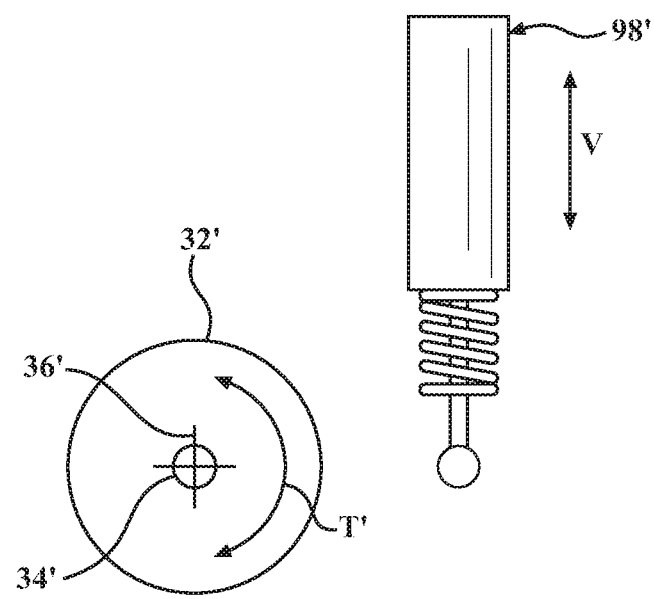
FIG. 9 is a schematic side view illustrating an orientation of a prior art electric propulsion motor and a vehicle suspension, as described herein.

The invention comprises an electric vehicle comprising a selectively movable electric propulsion motor that is configured to be oriented in a substantially vertical direction and movable with reference to a rotatable vehicle drive axle, and methods of making and using the electric vehicle and the selectively movable electric propulsion motor. As illustrated in FIG. 9, horizontal positioning of electric propulsion motors 32' can be disadvantageous because they are frequently positioned adjacent to horizontally extending portions of the vehicle structure, such as steering systems and components and powertrain systems and components, including transaxles and differentials, which may impede the ability to direct a cooling airflow from the front of the vehicle onto the motor for air cooling during vehicle operation. By positioning the selectively movable electric propulsion motor vertically, limitations due to horizontally extending portions of the vehicle are reduced or avoided, and more of the body of the electric propulsion motor is available for exposure to a cooling airflow from the front of the vehicle, thereby enabling the electric motor to be cooled without the use of additional cooling systems. Vertical positioning of the electric propulsion motor advantageously enables the design of unique vertically-extending cooling ducts to direct air at/around the electric propulsion motor. The selectively movable electric propulsion motor in the vertical orientation may also comprise primary heat dissipating components in a vertically-extending orientation facing the front of the electric vehicle to take advantage of the vertically-extending cooling ducts.

Figure 5:
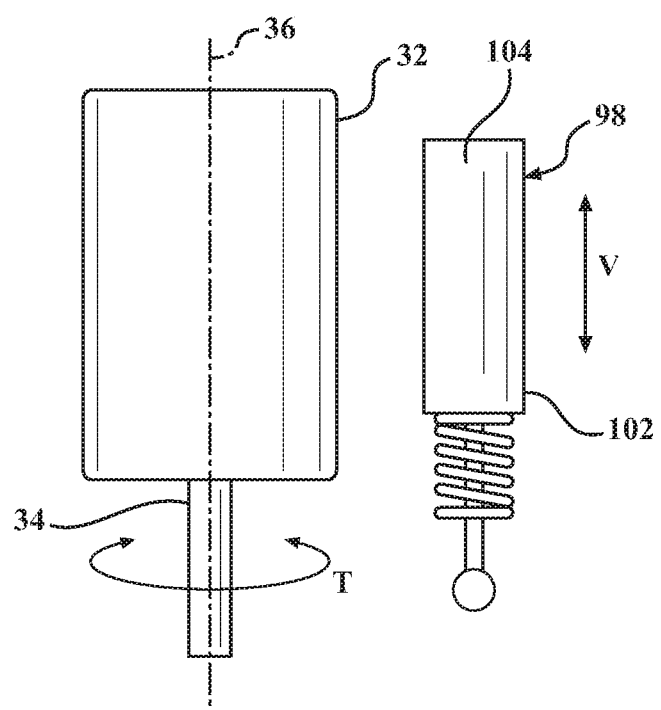
FIG. 5 is a schematic side view illustrating an orientation of a selectively movable vertical electric propulsion motor and a vehicle suspension, as described herein.

As illustrated in FIG. 5, vertical positioning of the selectively movable electric propulsion motor 32 also advantageously provides a propulsion system where the torques acting on the drive train and the vehicle chassis are not acting on the suspension in a way perceivable to the driver and/or passengers. That is, the motor torques (T) during operation of the electric propulsion motor when it is oriented vertically are not acting in a vertical plane like much of the suspension system and many of the suspension components, but rather they are acting in a horizontal plane. Thus, the motor torques are less perceptible to the driver and/or passengers and the need to compensate for torques (T) acting in the vertical plane, whether for human users or other vehicle systems, is reduced or eliminated. Decoupling the motor torques from the suspension system also provides noise, vibration, and harshness (NVH) benefits by reducing or eliminating sources of vertical vibration within the chassis of the electric vehicle.

The electric vehicle of this invention orients the electric propulsion motor in the vertical direction. The rotatable motor shaft and the motor axis are oriented downwardly and configured for attachment to a power transmission coupling, such as a differential, to power the driven wheels.

In certain embodiments, the electric propulsion motor of the electric vehicle may be rotated about the rotatable vehicle drive axle and may be rotated towards the front and/or the rear of the vehicle about the rotatable vehicle drive axle. For example, the motor can be in a horizontal (e.g., down) position rotated toward either the front or rear of the vehicle and can heat up faster during a cold start condition for peak efficiency in a start mode. As the motor heats up, it can be rotated back to the vertical orientation for more efficient cooling in an operation mode. In other words, the electric propulsion motor can be efficiently rotated from a start mode to an operation mode to optimize a motor characteristic, such as the internal motor operating temperature, or toward or away from the vehicle cabin to affect a vehicle cabin characteristic, such as providing more or less heat to the vehicle cabin. In another example, the rotatable motor orientation can also take advantage of dampening out motor harmonics. For example, the motor can be rotated from a first position or and direction (e.g., frontward facing at an acute angle from vertical) to a second position and direction (e.g., rearward facing at an acute angle from vertical) dynamically as a function of the motor speed (e.g., RPM) to simultaneously dampen out a motor characteristic, such as a motor vibrational harmonic and/or a vehicle characteristic, such as a suspension harmonic. In one embodiment, the drive train (e.g., electric propulsion motor and drive train components to which the electric propulsion motor is coupled) harmonics may be used to dampen or cancel suspension harmonics.

In certain embodiments, the electric propulsion motor can be rotated from a first position to a second position as a function of or to affect (i.e., change) a vehicle characteristic, such as the vehicle center of mass. The orientation of the electric propulsion motor can be changed, thus changing the center of mass of the vehicle, which may improve traction in the event of a terrain change, such as when traversing different terrain or attempting to get the vehicle unstuck, etc. If the vehicle is in an off-balance condition or encountering an undesirable or unstable vehicle stability condition during operation (e.g., cornering and/or braking), the change in motor orientation may be used to affect stability control and the distribution of mass of the vehicle. The selectively movable electric propulsion motor can also be rotated from one position (e.g., a first position/direction) to another position (e.g., a second position/direction), thus changing the center of mass of the vehicle, as a function of an environmental characteristic, such as a temperature of the external environment, or precipitation (e.g., rain, snow, or ice external), or wind speed and direction, or other characteristics of the environment.

As used herein, the terms front or forward or rear or rearward or aft refer to the front or the rear of the article or thevehicle, or to a direction toward the front or the rear of the article or the vehicle, respectively. The term longitudinal or along the length refers to a direction that extends along or generally parallel to an article or a vehicle centerline between the front and the rear, or from one end to an opposed end. The term transverse, or lateral, or along the width, or left-right refers to a direction that is orthogonal, or substantially orthogonal, to the longitudinal direction. The terms up or upward or down or downward refer to the top or the bottom of the article or the vehicle, or to a direction substantially toward the top or the bottom of the article or the vehicle, respectively. The terms in or inner or inward refer to a direction toward the center of the article or the vehicle, and out or outer or outward refers to the opposite direction away from the center or the central portion of the article or the vehicle.

Referring to the figures, and particularly FIGS. 1, 2A-2C, 3, 4A, 4B and 5, an electric vehicle 10 is disclosed. The electric vehicle 10 may comprise all manner of wheeled electric vehicles. The electric vehicle 10 may include all manner of electric automotive vehicles, including all manner of cars, sport and other types of utility vehicles (SUVs), and trucks, including light-duty, medium-duty, and heavy-duty trucks. The electric vehicle 10 may also include all manner of all-terrain vehicles (ATVs) and side-by-side vehicles, including utility or utility task vehicles (UTVs) and multipurpose off-highway utility vehicles (MOHUVs). The electric vehicle 10 may comprise an electric vehicle (EV), where all of the motive power of the vehicle wheels is provided by a selectively movable electric propulsion motor 32 as described herein, or a hybrid electric vehicle where the motive power to a portion of the vehicle wheels is provided by electric motors as described herein and the motive power to another portion of the vehicle wheels is provided by other sources of motive power, such as, for example, an internal combustion engine.

The electric vehicle 10 comprises a vehicle chassis 12 extending along a longitudinal axis 14 of the electric vehicle 10 and a rotatable vehicle drive axle 16 disposed along a transverse axis 18 or axle axis that has opposed axle ends 20, 22 that are configured for attachment of a pair of opposed drive wheels 24, 26. As used herein, the vehicle chassis 12 may comprise any fixed portion of the electric vehicle 10 and may comprise the vehicle frame or body, particularly in vehicles that employ unibody construction, or a combination thereof. The selectively movable electric propulsion motor 32 may be used on the electric vehicle 10 in conjunction with a rotatable vehicle drive axle 16 in any desired manner or location, including as a front rotatable vehicle drive axle 28 (e.g., in a front wheel drive (FWD) vehicle) with opposed front drive wheels, a rear rotatable vehicle drive axle 30 (e.g., in a rear wheel drive (RWD) vehicle) with opposed rear drive wheels, or as a front rotatable vehicle drive axle with opposed front drive wheels and a rear rotatable vehicle drive axle with opposed rear drive wheels (e.g., in an all-wheel drive (AWD) or four-wheel drive (4WD) vehicle).

The electric vehicle 10 also comprises a selectively movable electric propulsion motor 32 comprising a rotatable motor shaft 34 that is reversibly rotatable in either direction about a motor axis 36. The selectively movable electric propulsion motor 32 may comprise any suitable number or type of electric propulsion motor. In one embodiment, the selectively movable electric propulsion motor 32 comprises a pair of selectively movable electric propulsion motors, a front selectively movable electric propulsion motor 38 and a rear selectively movable electric propulsion motor 40. The front selectively movable electric propulsion motor 38 and the rear selectively movable electric propulsion motor 40 may be identical to one another and may comprise the same motor type, as described herein, and/or utilize the same motor construction (e.g., stator and rotor configuration), and/or may have the same motive power output (e.g., torque output). Alternately, the front selectively movable electric propulsion motor 38 and rear selectively movable electric propulsion motor 40 may be different from one another and may comprise different motor types, as described herein, and/or utilize different motor constructions (e.g., stator and rotor configurations), and/or may have different motive power outputs (e.g., torque outputs).

In one embodiment, as illustrated in FIGS. 1 and 2A-2C, a selectively movable electric propulsion motor 38 and/or a rear selectively movable electric propulsion motor 40 each comprise a stator 44 that has an axially-extending cylindrical shape and is configured to be fixed and stationary and a selectively reversibly rotatable rotor 42 that is configured for selectively reversible rotation and is disposed radially inwardly of and concentric with the stator 44 and that also has an axially-extending cylindrical shape. The selectively movable electric propulsion motor 32 may comprise any suitable type of electric motor comprising a fixed stator 44 and a selectively reversibly rotatable rotor 42 disposed within the stator 44, including various alternating current (AC) and direct current (DC) powered electric motors, including both brushed (BDC) and brushless (BLDC) electric propulsion motors. In one embodiment, the selectively movable electric propulsion motor 32 comprises an AC electric propulsion motor and conventional power electronics including a current inverter and a voltage converter. The DC power and current from the vehicle battery 46 is converted to AC power and current using the power inverter and the voltage from the vehicle battery 46 is stepped up to a high voltage (e.g., about 210 VDC to about 650 VAC) using the voltage converter. The power electronics may be disposed within the selectively movable electric propulsion motor 32, particularly proximate the stator 44, or elsewhere in the electric vehicle 10, including as a part of a vehicle controller 48 which may comprise a plurality of vehicle controllers, including the motor controller 50, or as part of the vehicle battery 46, or on a standalone basis. The high voltage AC power may be supplied to the selectively movable electric propulsion motor 32 by any suitable inner electrical power and/or signal communication device 52, such as a motor power bus 54 that comprises an electrical conductor configured to electrically communicate high voltage from the power electronics, which may be electrically connected to the selectively movable electric propulsion motor 32 by any suitable electrical power attachment, including an electrical connector 56. The selectively movable electric propulsion motor 32 is configured to be mounted within the vehicle chassis 12 and operatively coupled to the rotatable vehicle drive axle 16 and opposed drive wheels 24, 26 as described herein. In one embodiment, the rotatable vehicle drive axle 16 and opposed drive wheels 24, 26 may comprise a conventional rotatable vehicle drive axle 16, which may include rotatable vehicle drive axle half shafts or axle portions extending from a selectively movable differential 60 and operatively coupled to the opposed drive wheels 24, 26 in a conventional manner, including the use of axle housings 61, axle bearings, wheel bearings, wheel hubs, and the like, as well as operative coupling to brake systems and components, steering systems and components, and suspension systems and components as are known in the art. The selectively movable electric propulsion motor 32 and motor axis 36 are configured to be oriented in a substantially vertical direction and movable with reference to the rotatable vehicle drive axle 16. As used herein, substantially vertical means that the selectively movable electric propulsion motor 32 and motor axis 36 are configured to be mounted in, and/or may be selectively moved into, a position where they are nearly vertical, for example, within 0-15°, more particularly 0-10°, and more particularly 0-5° of a vertical orientation, and including a vertical orientation. As used herein, selectively movable means movable by an electrically powered motor actuator 62 by any suitable electrical power and/or signal communication device 63, such as an actuator power bus 65 that comprises an electrical conductor configured to electrically communicate voltage and current from the battery 46, which may be electrically connected to the electrically powered motor actuator by any suitable electrical power attachment, including an electrical connector 67, for example. The electrically powered motor actuator 62 may be actuated to selectively move and change the position of the selectively movable electric propulsion motor 32 and motor axis 36 in any suitable manner, including manually or automatically. In one embodiment (not shown), the electrically powered motor actuator 62 may be actuated manually in a conventional manner by a human user by operation of a switch, for example. In another embodiment, the electrically powered motor actuator 62 may actuated using a control signal from the signal communication device 63 through actuator power bus 65 to the motor actuator 62 in a conventional manner in conjunction with a control algorithm that is executed as a computer program by a vehicle controller 48, such as the motor controller 50, or a separate actuator controller 51 that is in signal communication with the motor controller 48, as illustrated schematically in FIGS. 1 and 2A-2C.

Figure 1:
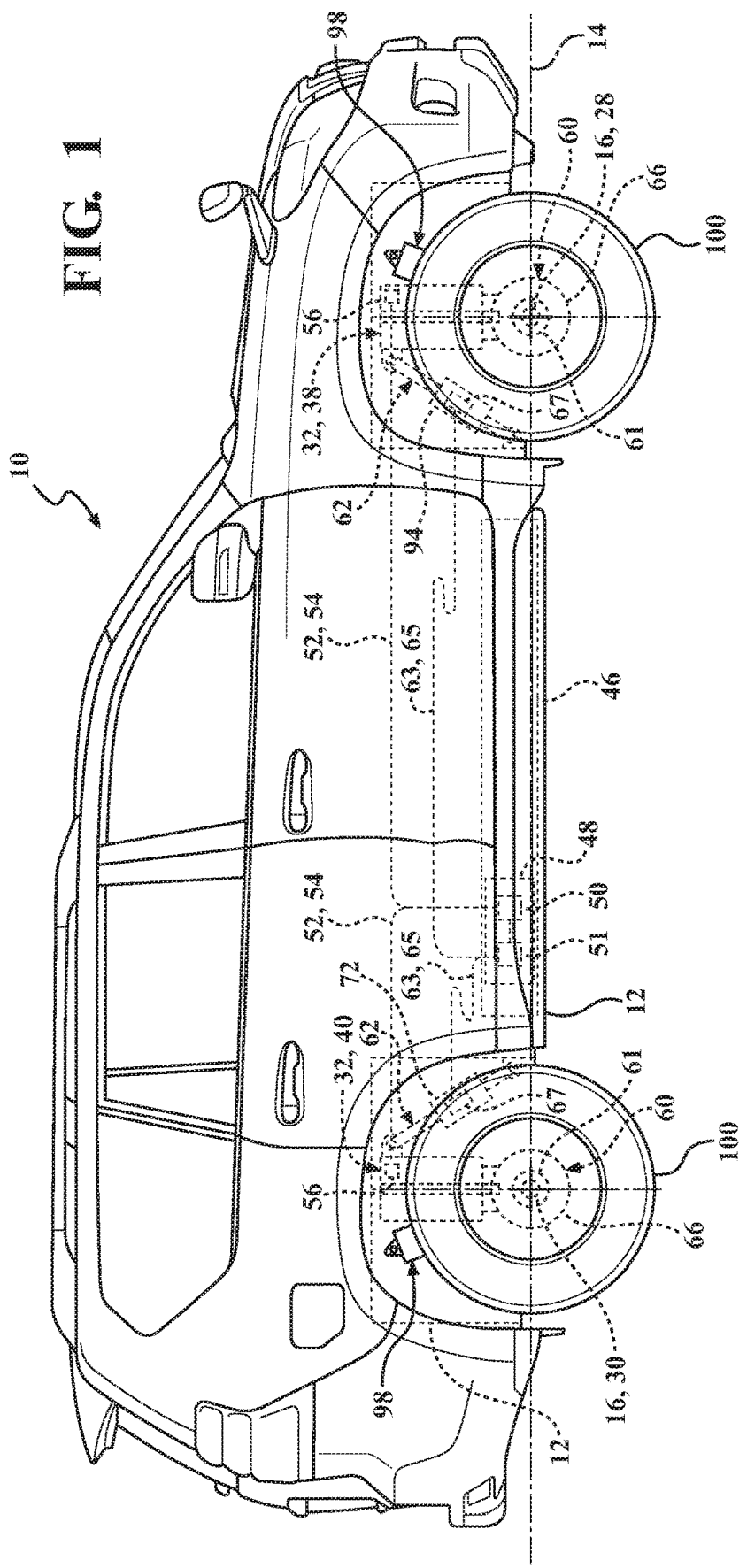
FIG. 1 is a schematic side view of an embodiment of an electric vehicle comprising a selectively movable vertical electric propulsion motor as described herein.
Figure 2A:
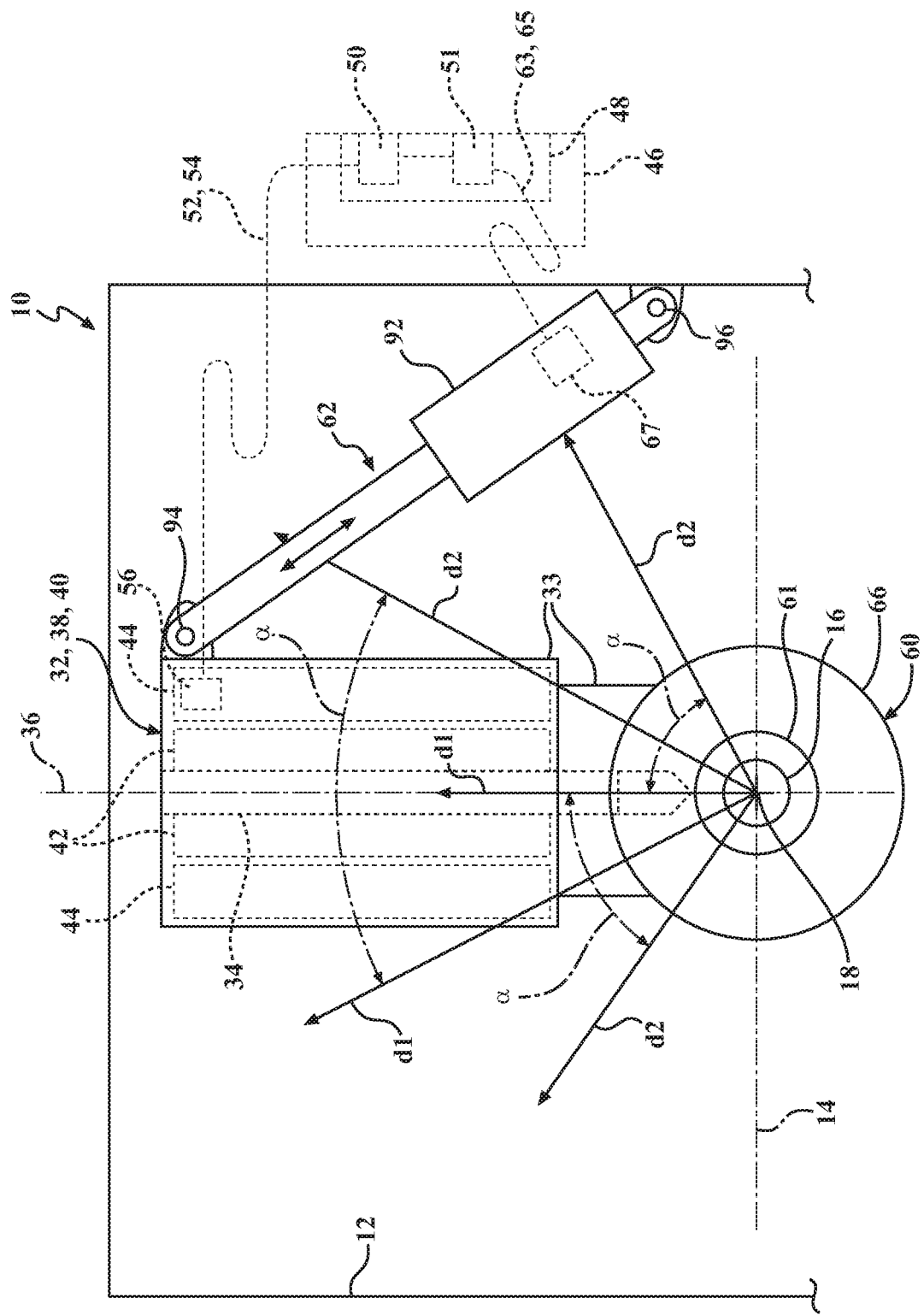
FIG. 2A-2C are schematic side views of embodiments of selectively movable vertical electric propulsion motors and selectively movable differentials and actuators, as described herein, illustrating ranges movement of thereof, as described herein.
Figure 2B:
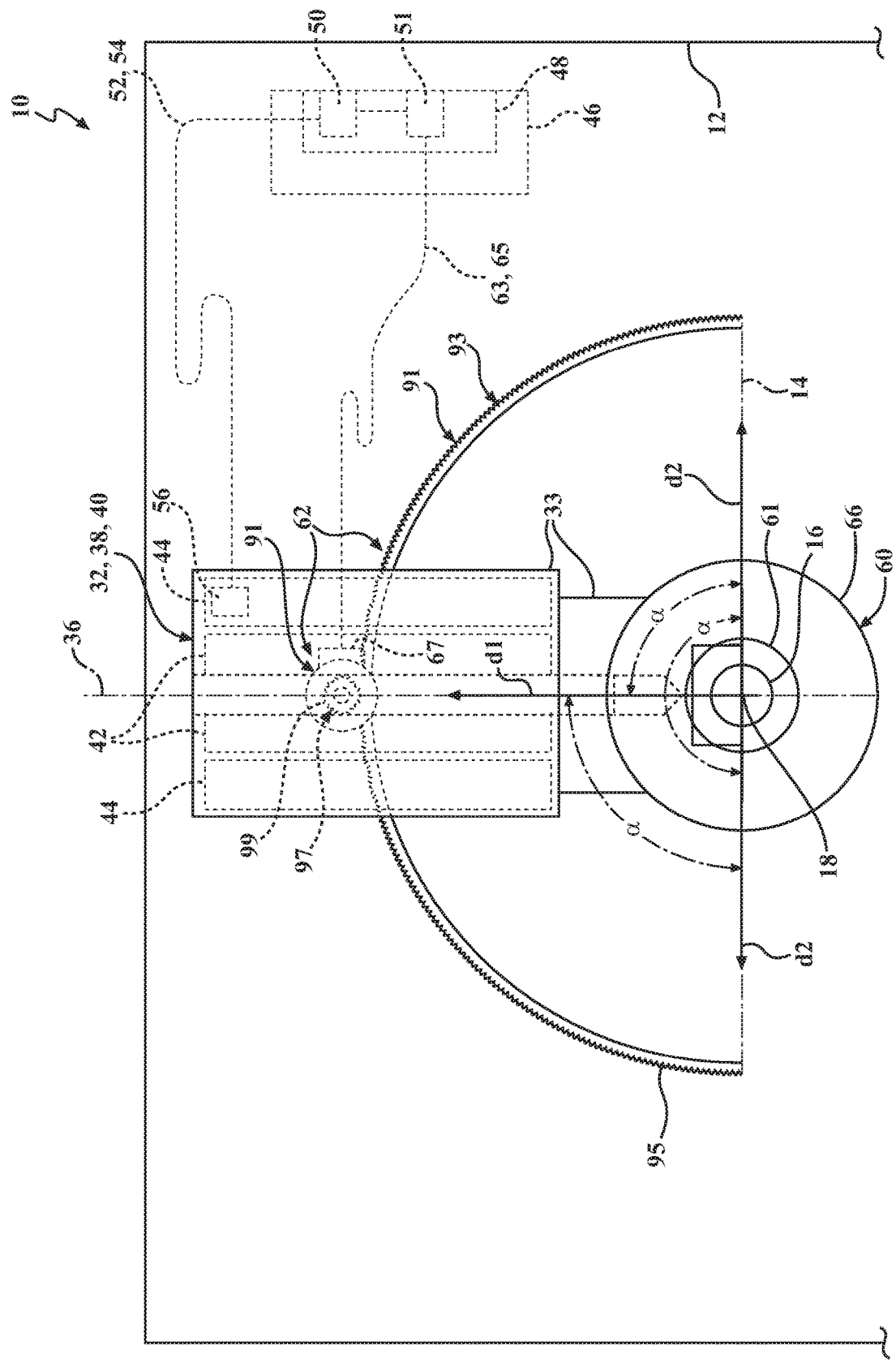
Figure 2C:
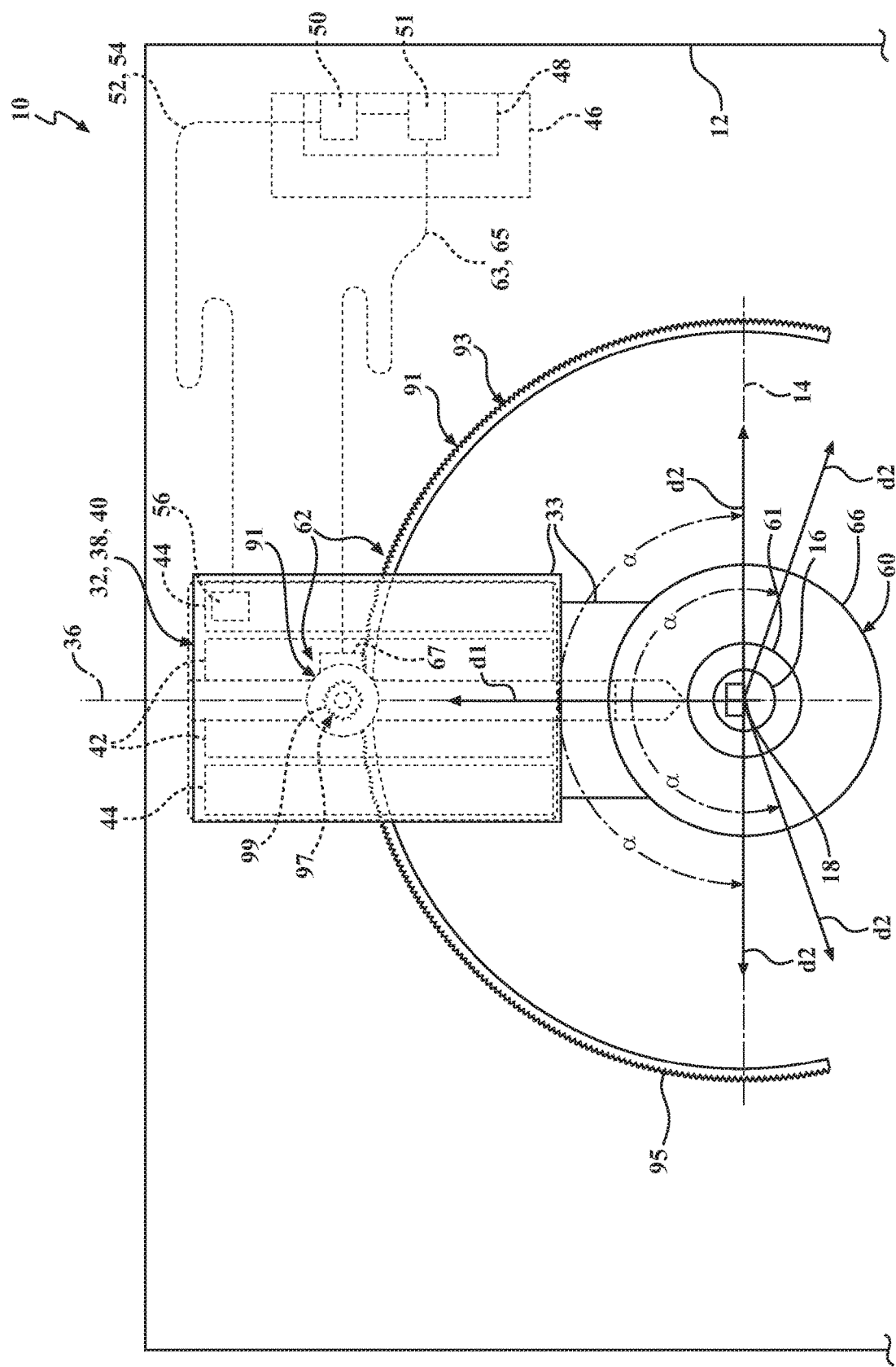
Figure 3:
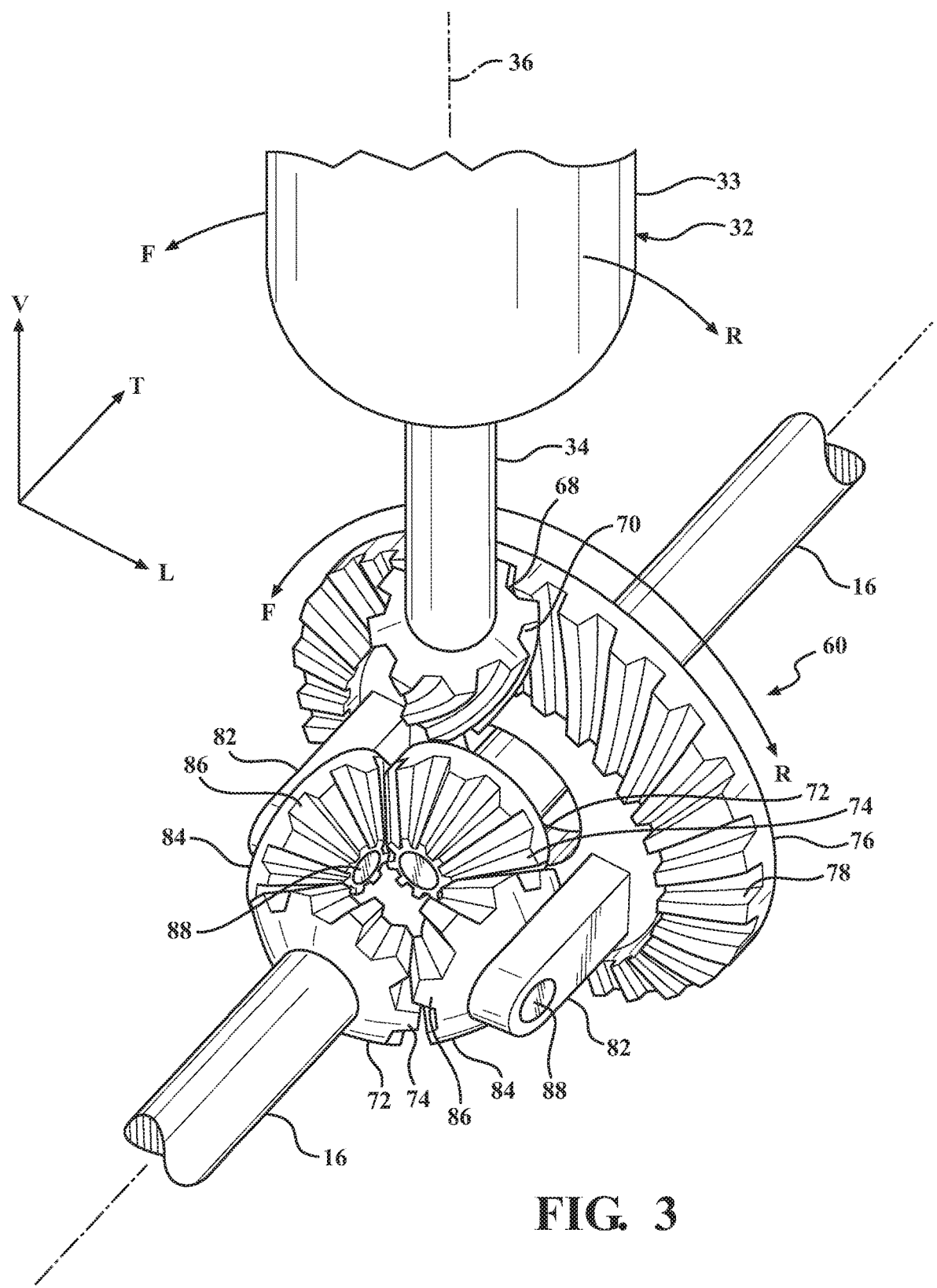
FIG. 3 is a perspective view of an embodiment of a selectively movable substantially vertical electric propulsion motor and a selectively moveable differential with the differential housing removed, as described herein.

In one embodiment, as shown in FIGS. 1, 2A-2C, 3, and 6, for example, the selectively movable differential 60 is disposed on the rotatable vehicle drive axle 16 and is configured to operatively couple the motive power of the selectively movable electric propulsion motor 32 that is transmitted to the rotatable motor shaft 34 to the rotatable vehicle drive axle 16. The selectively movable differential 60 comprises a differential housing 66, which in one embodiment may be substantially spherical, or spherical, and may comprise opposed hemispheres that are selectively attachable to and detachable from one another, such by the use of a plurality of threaded fasteners (not shown) that extend through a corresponding plurality of housing bores 69. In one embodiment, the selectively movable differential 60 comprises a differential housing 66, a shaft gear 68, which in one embodiment comprises a pinion gear having a plurality of shaft gear teeth 70, attached to the rotatable motor shaft 34 and disposed within the differential housing 66, and a drive axle gear 72 or gears having a plurality of axle gear teeth 74 attached to the rotatable vehicle drive axle 16 and disposed within the selectively movable differential 60, wherein the shaft gear 68 and associated gear teeth 70 is operatively coupled to the drive axle gear(s) 72 and associated axle gear teeth 74. In one embodiment, the shaft gear 68 is operatively coupled to the drive axle gears 72 through a ring gear 76 having a plurality of ring gear teeth 78 that is concentrically and rotatably disposed on the rotatable vehicle drive axle 16, such as through a ring gear bearing (not shown) as is known in the art. The ring gear 76 and ring gear teeth 78 are configured for reversible rotatable meshed engagement with the shaft gear 68 and shaft gear teeth 70, such that rotation of the rotatable motor shaft 34 and shaft gear 68 produces rotation of the ring gear in a forward (F) or rearward (R) direction as shown in FIG. 3. The ring gear 76 comprises a spider 80 comprising a pair of orthogonally protruding spider arms 82 that are configured to rotatably support a pair of inwardly facing spider gears 84 having a plurality of spider gear teeth 86 that are rotatably disposed on inwardly extending pins 88 by spider bearings (not shown) as known in the art. The spider gears 84 and spider gear teeth 86 are configured for reversible rotatable meshed engagement with the drive axle gears 72 and axle gear teeth 74. Thus, selectively reversible rotation of the rotatable motor shaft 34 of the selectively movable electric propulsion motor 32 produces rotation of the ring gear 76 and spider gears 84 resulting in rotation of the axle gears 72 and the rotatable vehicle drive axle 16, thereby resulting in rotation of the opposed drive wheels 24, 26 and selectively reversible propulsion of the electric vehicle 10 in a forward or rearward direction.

In one embodiment, the selectively movable electric propulsion motor 32 comprises, and the motor components thereof described herein are housed within, a motor housing 33 that has a cylindrical shape and extends axially along the motor axis 36. The motor housing 33 is configured for selective attachment to and detachment from the differential housing 66. The motor housing 33 may be selectively attached to and detached from the differential housing 66 by any suitable attachment device, which in one embodiment (not shown) comprises a plurality of threaded fasteners that are inserted through plurality of circumferentially spaced bores through a circumferential attachment flange disposed on an open end of the motor housing 33 disposed toward the selectively movable differential 60, and which for attachment are threaded into (or for detachment out of) a corresponding plurality of circumferentially spaced threaded bores in the differential housing 66.

Figure 6:
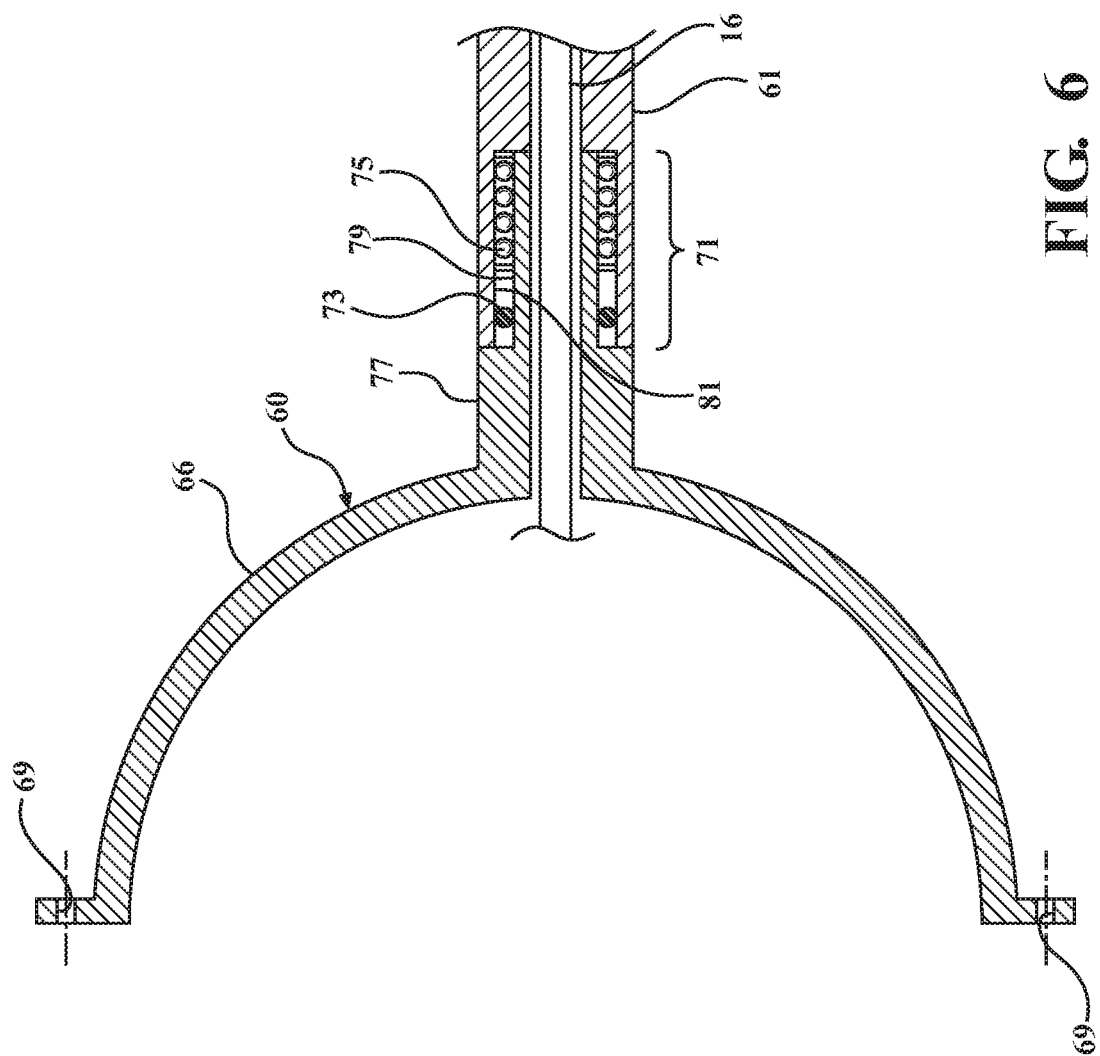
FIG. 6 is a schematic top cross-sectional view of an embodiment of a differential housing of a selectively movable vertical electric propulsion motor, a selectively movable vehicle differential, and a vehicle axle, as described herein.

Referring to FIG. 6, the selectively movable differential 60 is movable in that it is rotatable about the rotatable vehicle drive axle 16 and transverse or axle axis 18 as described herein. The selectively movable differential 60 is configured to rotate about the rotatable vehicle drive axle 16 and transverse or axle axis 18 through the use of a sealed rotatable coupling 71 disposed between the selectively movable differential 60 and the axle housing 61, wherein the axle housing is fixed to the vehicle chassis 12 in a known manner, such as by one or more bolted connections (not shown), and the differential housing 66 is rotatable about the axle housing 61 via the sealed rotatable coupling 71. Any suitable sealed rotatable coupling 71 may be employed. In one embodiment, the sealed rotatable coupling 71 comprises a seal 73, such as an O-ring seal, to prevent the ingress of water, dirt, road salt, or other external contaminants, and to retain any lubricants (e.g., oil or greases) disposed within the differential housing 66 or the axle housing 61. The sealed rotatable coupling 71 also comprises a bearing 75 disposed between the differential housing 66 and the axle housing 61 and configured to enable the movement (i.e., rotation) of the selectively movable differential 60 about the axle housing 61. In one embodiment, opposed halves of the differential housing 66 each include a protruding cylindrical axle portion 77 with a shoulder 79 that is configured to receive the seal 73 and the bearing 75 in sealed and pressed engagement. The axle housing 61, such as a cylindrical axle housing, also comprises a cylindrical counterbore 81 and is also configured to receive the seal 73 and the bearing 75 in sealed and pressed engagement.

It will be understood that for the selectively movable electric propulsion motor 32, a selectively movable differential may be used on the electric vehicle 10 in conjunction with a rotatable vehicle drive axle 16 in any desired manner or location, including as a front axle 28 (e.g., in a front-wheel drive vehicle (FWD vehicle)), or a rear axle 30 (e.g., in a rear-wheel drive vehicle (RWD vehicle)), or as a front axle and a rear axle (e.g., in an all-wheel drive vehicle (AWD vehicle) or four-wheel drive vehicle (4WD vehicle)). In one embodiment, both the front axle 28 and the rear axle 30 comprise a selectively movable electric propulsion motor 32 and FWD, RWD, and AWD driving modes may be accomplished by powering and using the selectively movable electric propulsion motor 32 disposed on the front axle 28, or the selectively movable electric propulsion motor 32 disposed on the rear axle 30, or both the selectively movable electric propulsion motor disposed on the front axle and the selectively movable electric propulsion motor disposed on the rear axle 30, respectively. In one embodiment, the front axle 28 comprises a selectively movable electric propulsion motor 32 and a rear axle 30is an unpowered axle 17, such as a solid unpowered axle, comprising driven wheels 24, 26 and the electric vehicle 10 comprises an FWD vehicle. In another embodiment, the rear axle 30 comprises a selectively movable electric propulsion motor 32 and a front axle 28 is an unpowered axle 17, such as a solid unpowered axle, comprising steerable driven wheels 24, 26 and the electric vehicle 10 comprises an RWD vehicle.

In one embodiment, as shown in FIGS. 1 and 2A, the electric vehicle 10 also comprises a motor actuator 62 operatively coupled to the selectively movable electric propulsion motor 32 and the vehicle chassis 12. The motor actuator 62 may comprise any suitable actuator that may be configured to move the selectively movable electric propulsion motor 32 and motor axis 36 radially about the transverse (axle) axis 18. In one embodiment, the motor actuator 62 may comprise an electrically powered linear actuator 92 that is pivotably attached to the selectively movable electric propulsion motor 32 by a motor pivot 94 and to the vehicle chassis 12 by a chassis pivot 96. Any suitable electrically powered linear actuator 92 configured to provide linear motion sufficient to change the length of the actuator (i.e., selectively increase and decrease the length of the actuator) and thereby cause the selectively movable electric propulsion motor 32 and motor axis 36 to rotate about the transverse axis 18 by operation of the motor pivot 94 and chassis pivot 96. The electrically powered linear actuator 92 may be electrically connected and controlled as described herein. The electrically powered linear actuator 92 may comprise any suitable type of electrically powered linear actuator, including electrical, electromechanical, electropneumatic, and electrohydraulic linear actuators, such as various electromechanical ball screw, leadscrew, and rack and pinion type linear actuators. The positions of motor pivot 94 on the selectively movable electric propulsion motor 32 and chassis pivot 96 on vehicle chassis 12 and the range of movement of the motor actuator 62 may be selected to provide a predetermined angular range of motor movement, which in one embodiment may be angle (α), as described herein. The range of movement of selectively movable electric propulsion motor 32 and motor axis 36 will be selected to include a substantially vertical position, including a vertical position, as described herein.

In another embodiment, as shown in FIGS. 2B and 2C, the motor actuator 62 may comprise an electrically powered rack and pinion actuator 91. The electrically powered rack and pinion actuator 91 comprises a circumferentially extending rack 93 that is concentrically circumferentially disposed about the transverse axis 18. The circumferentially extending rack 93 comprises a plurality of rack teeth 95 disposed on an outer edge. In one embodiment, the circumferentially extending rack 93 may be attached to the vehicle chassis 12. The electrically powered rack and pinion actuator 91 also comprises a rack gear 97, such as a pinion gear, comprising a plurality of rack gear teeth 99 that are configured for meshed engagement with the rack teeth 95. The rack gear 97 is attached to a rotatable rack gear shaft of a selectively reversibly rotatable electric rack motor, which is attached to the motor housing 33. The electrically powered rack and pinion actuator 91 and the rotatable electric rack motor may be electrically connected and controlled as described herein. The operation of the rotatable electric rack motor 103 rotates the rack gear 97 and rack gear teeth 99 and their meshed engagement with the rack teeth 95 causes the translation of the rotatable electric rack motor and motor housing 33 along the rack 93 and rotation of the selectively movable electric propulsion motor 32 about the transverse axis 18. The electrically powered rack and pinion actuator 91 may be configured to provide any predetermined angular range of motor movement, which in one embodiment may be angle (α), as described herein. As shown in FIGS. 2B and 2C, the electrically powered rack and pinion actuator 91 is particularly configured to provide large ranges of angle (α). This includes angle (α) up to and including right angles (e.g., 0-90°) forward or rearward (i.e., 0-180° overall) as shown in FIG. 2B. This also includes angle (α) up to and including obtuse angles (e.g., 0-120°) forward or rearward (i.e., 0-240° overall) as shown in FIG. 2C. The range of movement of electric propulsion motor 32 and motor axis 36 will be selected to include a substantially vertical position, including a vertical position, as described herein.

Referring to FIGS. 1 and 2A-2C, the motor actuator 62 is configured to move the selectively movable electric propulsion motor 32 and the motor axis 36 from a first position comprising the first direction ($d_1$) of the motor axis 36 to a second position comprising a second direction ($d_2$) of the motor axis, the second position being separated from the first position by the angle (α). In one embodiment, the motor actuator 62 is configured to move the selectively movable electric propulsion motor 32 and the motor axis 36 from a first radial position about the transverse axis 18 comprising a first radial direction ($d_1$) of the motor axis 36 to a second radial position comprising a second radial direction ($d_2$) of the motor axis 36, the second position being separated from the first position by the angle (α). In one embodiment, the selectively movable electric propulsion motor 32 the and motor axis 36 is selectively movable from the first position comprising the first direction ($d_1$) of the motor axis 36 to the second position comprising the second direction ($d_2$) of the motor axis 36 where the second position is separated from the first position by the angle (α) both while the electric vehicle 10 is stationary or in motion. In one embodiment, the first radial direction ($d_1$) and first radial position and the second radial direction ($d_2$) and second radial position correspond to a starting position and an ending position, respectively, of a particular movement of the selectively movable electric propulsion motor 32 and the angle (α) comprises an angular range of motor movement, and the starting position and the ending position may be reversed. Furthermore, the first radial direction ($d_1$) and the first radial position and the second radial direction ($d_2$) and the second radial position may be selected to be any positions within the range of motor movement of the selectively movable electric propulsion motor 32. In one embodiment, the angle ($\alpha$) may comprise an acute angle (FIG. 2A), or in another embodiment a right angle (FIG. 2B), or in yet another embodiment an obtuse angle (FIG. 2C). In one embodiment, the angle ($\alpha$) opens forward of the rotatable vehicle drive axle 16, and in another embodiment rearward of the rotatable vehicle drive axle 16, and in yet another embodiment both forward and rearward of the rotatable vehicle drive axle 16. It will be understood that the first radial directions ($d_1$) and the first radial positions and the second radial directions ($d_2$) and the second radial positions may be reversed from those illustrated herein.

Referring to FIGS. 2A-2C and FIGS. 4A and 4B, in one embodiment, the first radial direction ($d_1$) corresponds to a motor start mode and the second radial direction ($d_2$) comprises a motor operation mode, wherein the radial direction comprises a horizontal vector and a vertical vector, and wherein the vertical vector in the motor start mode is less than the vertical vector in the motor operation mode. Thus, in the motor start mode where the selectively movable electric propulsion motor 32 is generally at ambient temperature, which in many climates may comprise a cold start mode, the selectively movable electric propulsion motor 32 is more horizontally oriented (e.g., substantially horizontal) where it receives less of a vertically oriented airflow cooling 108 as described herein and will therefore warm up more quickly to an operating temperature. Furthermore, in the motor operation mode where operation of the selectively movable electric propulsion motor 32 is generating heat, the selectively movable electric propulsion motor 32 is more vertically oriented (e.g., substantially vertical) compared to the motor radial direction and position in the motor start mode where it is receives more of the vertically oriented airflow cooling 108 resulting from vehicle movement, as described herein, and will therefore receive a greater airflow cooling 108, or be able to provide more motor heat removed by the airflow cooling 108 to the passenger compartment, for example.

In one embodiment, as illustrated in FIGS. 1, 2A-2C, 3, 4A, 4B and 5, for example, the electric vehicle 10 also comprises a vehicle suspension 98 configured to resiliently or springingly support the mass of the electric vehicle 10, including the mass of the vehicle chassis 12, as a sprung mass as is known in the art. The vehicle suspension 98 and vehicle wheels 100 comprise an unsprung mass of the electric vehicle 10 as is known in the art. The vehicle suspension 98 may comprise any suitable suspension component 102, including a plurality of shock absorbers 104 or struts corresponding to the plurality of vehicle wheels 100, and is configured to dampen impacts that result as the electric vehicle 10 is operated and moves over uneven ground surfaces, including various types of roadways or off-road paths or trails. In one embodiment, the electric vehicle 10 comprises a vehicle suspension 98 that includes a suspension component 102, such as a shock absorber 104 or strut, configured for motion in a substantially vertical plane, and the selectively movable electric propulsion motor 32 is configured to rotate the rotatable motor shaft 34 about the motor axis 36 to provide a motor torque in a plane that is substantially orthogonal to the substantially vertical plane.

Operation of the vehicle suspension 98, particularly while the electric vehicle 10 is loaded and moving, produces vibrations of various amplitudes and frequencies, which also result in harmonic (i.e., frequency) multiples of these frequencies, and which are referred to herein as vehicle suspension harmonics. Vehicle suspension harmonics may occur throughout the vehicle chassis 12, including within various of the vehicle components and systems disposed therein, and have resulted in a vehicle engineering discipline devoted to elimination or reduction of the noise, vibration and harshness (NVH) within electric vehicles 10. Similarly, operation of the selectively movable electric propulsion motor 32 or motors, particularly while the electric vehicle 10 is loaded and moving, also produces vibrations of various amplitudes and frequencies, which also result in harmonic (i.e., frequency) multiples of these frequencies, and which are referred to herein as electric propulsion motor harmonics. Electric propulsion motor harmonics may occur throughout the vehicle chassis 12 including within any of the various components and systems disclosed herein. In one embodiment, the selectively movable electric propulsion motor 32 is selectively movable from the first position and the first direction ($d_1$) to the second position and the second direction ($d_2$) to dampen (i.e., reduce and/or eliminate) an electric propulsion motor harmonic and/or a vehicle suspension harmonic.

In one embodiment, the electric vehicle 10 comprises a selectively movable electric propulsion motor 32 that is selectively movable from the first position and the first direction ($d_1$) to the second position and the second direction ($d_2$) as a function of a motor characteristic, a vehicle characteristic, a vehicle cabin characteristic, or a vehicle environmental characteristic. Any suitable motor characteristic of the selectively movable electric propulsion motor 32 may be used as a basis for moving from the first position and the first direction ($d_1$) to the second position and the second direction ($d_2$), including, for example, a motor current, a motor temperature, a motor load (e.g. torque output requirement), a motor speed or a motor speed command, a motor start condition (e.g., off/on) or a motor start condition command, or the like. Any suitable vehicle characteristic may be used as a basis for moving from the first position and the first direction ($d_1$) to the second position and the second direction ($d_2$), including, for example, a vehicle speed or a vehicle speed command, a vehicle acceleration or a vehicle acceleration command, a vehicle load (e.g., number and/or weight of occupants and cargo), a vehicle weight (e.g., an unloaded vehicle weight or a gross vehicle weight), a towed load weight, or the like. Any suitable vehicle cabin characteristic may be used as a basis for moving from the first position and the first direction ($d_1$) to the second position and the second direction ($d_2$), including, for example, a vehicle cabin temperature or a vehicle cabin temperature command, a vehicle cabin fan or a vehicle cabin fan command, a vehicle cabin air conditioning system condition (e.g., on/off) or a vehicle cabin air conditioning system condition command, a vehicle cabin infotainment system condition (e.g., on/off/sleep) or vehicle cabin infotainment system condition command, a vehicle seat temperature or a vehicle seat temperature command, a vehicle interior light condition (e.g. on/off) or a vehicle interior light command, or the like. Any suitable vehicle environmental characteristic (e.g. characteristic of the environment the vehicle is in) may be used as a basis for moving from the first position and the first direction ($d_1$) to the second position and the second direction ($d_2$), including, for example, a temperature of the environment, a precipitation condition of the environment (e.g., the presence or absence of rain, ice, snow, sleet, slush), a wind speed or direction, a roadway type (e.g., asphalt, cement, gravel, dirt, mud), or the like.

Figure 4A:
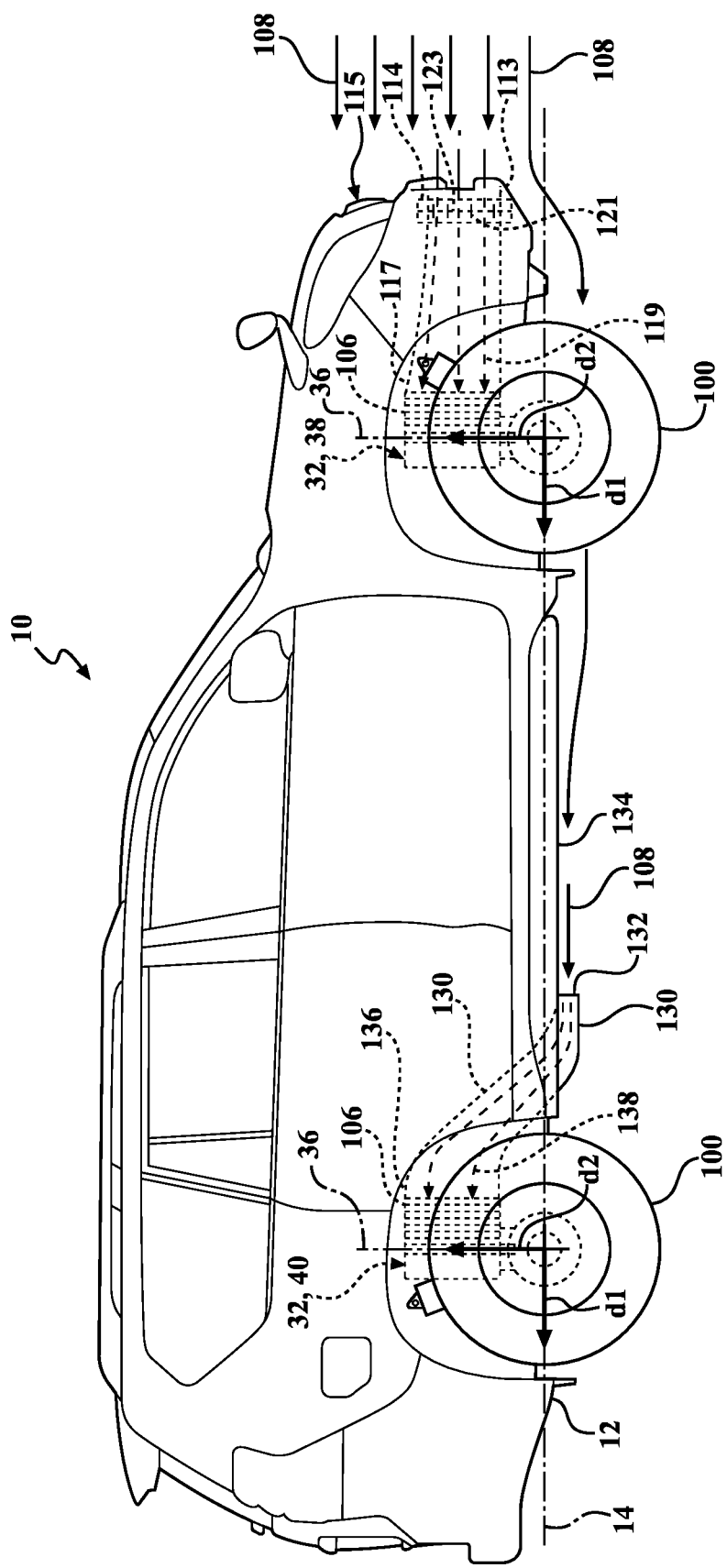
FIG. 4A is a schematic side view of an embodiment of an electric vehicle comprising a selectively movable vertical electric propulsion motor, a selectively movable differential, an air duct, and an airflow and heat dissipator, as described herein.
Figure 4B:
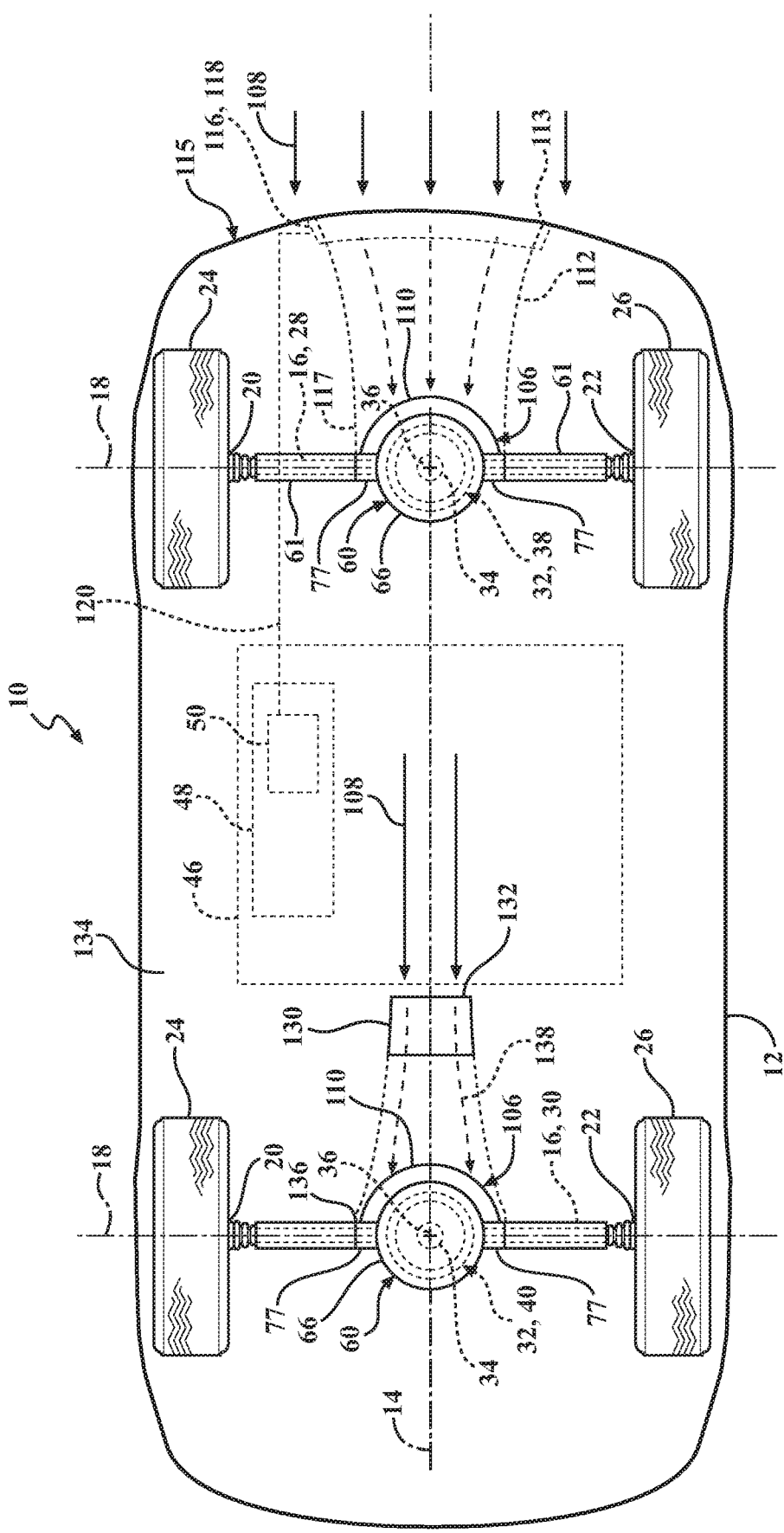
FIG. 4B is a schematic bottom view of the electric vehicle of FIG. 4A.

Referring to FIGS. 4A and 4B, in one embodiment, a heat dissipater 106, such as an axially-extending heat dissipater, is disposed on the selectively movable electric propulsion motor 32 facing toward the front of the electric vehicle 10 and extends along the motor axis 36. The heat dissipater 106 may comprise any suitable heat dissipater, including active heat dissipaters, such as various forms and types of closed loop, fluid-filled radiators that are filled with a recirculating heat transfer fluid, or thermoelectric coolers, and also including passive heat dissipaters, such as various conductive metals formed to include a plurality of spaced-apart heat transfer fins. The heat dissipater 106 is configured to extract heat generated by operation of the selectively movable electric propulsion motor 32, receive a vertically oriented airflow cooling 108, and dissipate the extracted heat by transferring it to the vertically oriented airflow cooling 108 through convection, conduction and radiation as is known in the art. In one embodiment, the axially extending heat dissipater 106 comprises a primary heat removal portion 110 that faces a front of the vehicle 10 and is configured for air cooling from the vertically oriented airflow cooling 108 received from the front 115 of the electric vehicle 10. In one embodiment, the vertically oriented airflow cooling 108 is directed within a front air duct 112 disposed within the vehicle chassis 12 that extends from a front end 113 proximate the vehicle front to a motor end 117 proximate the selectively movable electric propulsion motor 32, the front air duct 12 comprising a vertically-extending section proximate the motor end 117 to provide a vertically-extending airflow 119 to the primary heat removal portion. In one embodiment, the electric vehicle 10 also comprises a selectively openable and closable airflow shutter 114 that is disposed proximate to and in fluid communication with the front end of the front air duct 112 and that is configured to selectively control the vertically oriented airflow coolimg 108 within the front air duct 112. In one embodiment, the selectively openable and closable airflow shutter 114 comprises a plurality of individual shutter panels 121 joined together by a mechanical linkage or linkages 123 (e.g., disposed on the ends of the panels) that may be actuated by a shutter actuator 116 so that the shutter panels 121 may be partially opened/closed or completely opened/closed. In one embodiment, the shutter actuator 116 comprises an electric actuator, such as an electric motor or electric solenoid, that may be controlled by an shutter actuator position control input that may be provided as a control signal and may be transmitted either wirelessly or through a wired connection 120 to the shutter actuator 116 in a conventional manner in conjunction with a control algorithm that is executed as a computer program by a vehicle controller 48, such as the motor controller 50. In one embodiment, the vertically oriented airflow cooling108 is also directed within a rear air duct 130 that is disposed within the vehicle chassis 12 that extends from an inlet end 132 proximate the bottom 134 of the vehicle chassis 12 to a rear motor end 136 proximate the selectively movable electric propulsion motor 32. The rear air duct 130 also comprises a rear vertically-extending section proximate the rear motor end 136 to provide a rear vertically-extending airflow 138 to the primary heat removal portion 110.

Figure 7:
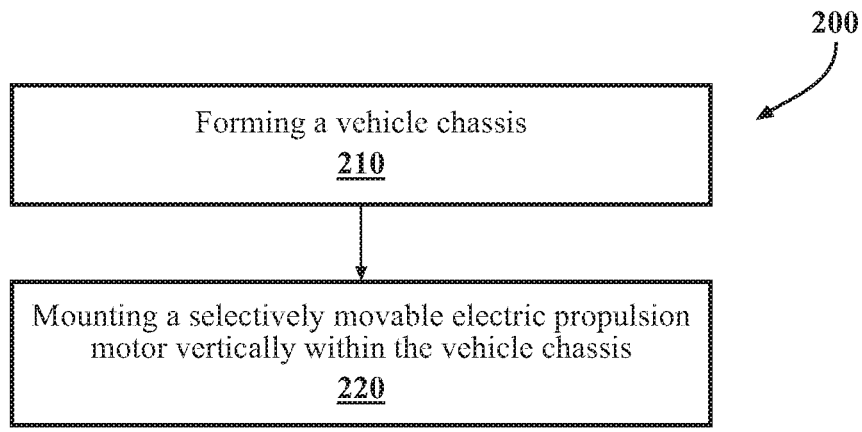
FIG. 7 is a flowchart of an embodiment of a method of making an electric vehicle, as described herein.

Referring to FIG. 7, in one embodiment, a method of making 200 an electric vehicle 10 is disclosed. The method of making 200 comprises forming 210 a vehicle chassis 12 extending along a longitudinal axis 14 and a rotatable vehicle drive axle 16 disposed along a transverse axis 18 and having opposed axle ends 20, 22 that are configured for attachment of a pair of opposed drive wheels 24, 26. The method of making 200 also includes mounting 220 a selectively movable electric propulsion motor 32 within the vehicle chassis 12 comprising a rotatable motor shaft 34 rotatable about a motor axis 36, the selectively movable electric propulsion motor 32 coupled to the rotatable vehicle drive axle 16 and opposed drive wheels 24, 26, the motor axis 36 configured to be oriented in a substantially vertical direction.

Figure 8:
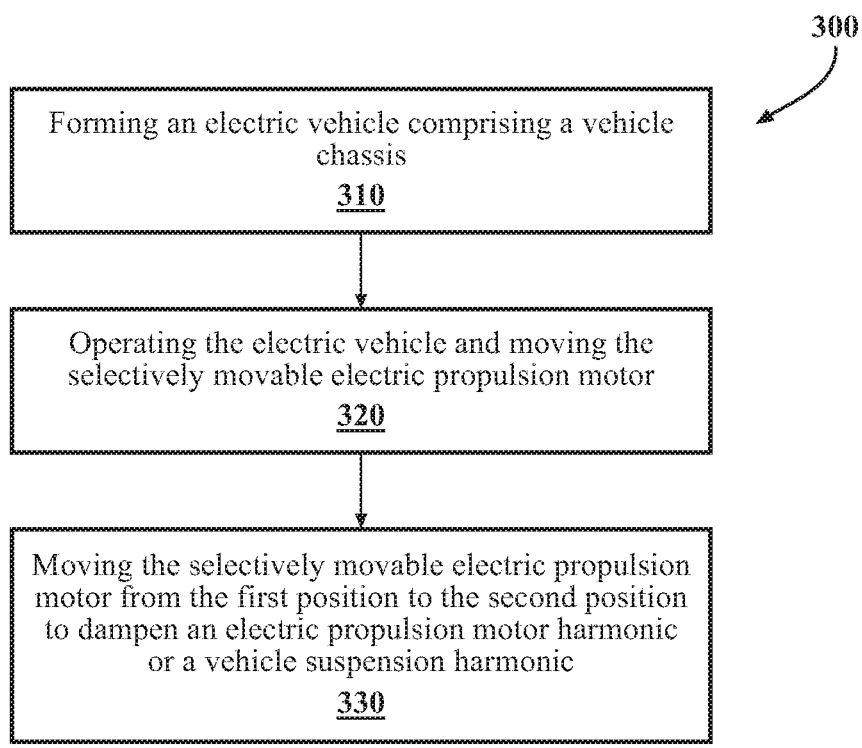
FIG. 8 is a flowchart of an embodiment of a method of using an electric vehicle, as described herein.

Referring to FIG. 8, in one embodiment, a method of using 300 an electric vehicle 10 is disclosed. The method of using 300 comprises forming 310 an electric vehicle 10 comprising a vehicle chassis 12 extending along a longitudinal axis 14 and a rotatable vehicle drive axle 16 disposed along a transverse axis 18 and having opposed axle ends 20, 22 that are configured for attachment of a pair of opposed drive wheels 24, 26, and a selectively movable electric propulsion motor 32 comprising a rotatable motor shaft 34 rotatable about a motor axis 36, the selectively movable electric propulsion motor 32 configured to be mounted within the vehicle chassis 12 and operatively coupled to the rotatable vehicle drive axle and opposed drive wheels 24, 26, the motor axis 36 configured to be oriented in a substantially vertical direction, the selectively movable electric propulsion motor 32 and the motor axis 36 also configured to be selectively movable while the vehicle 10 is stationary or in motion from a first position comprising a first direction ($d_1$) of the motor axis to a second position comprising a second direction ($d_2$) of the motor axis 36, the second position being separated from the first position by an angle ($\alpha$). The method of using 300 also comprises operating 320 the electric vehicle 10 and moving 330 the selectively movable electric propulsion motor 32 from the first position to the second position while the electric vehicle 10 is operating. In one embodiment, the electric vehicle 10 also comprises a vehicle suspension 98, wherein moving 330 the selectively movable electric propulsion motor 32 from the first position to the second position dampens an electric propulsion motor harmonic or a vehicle suspension harmonic as described herein.

The terms "a" and "an" herein do not denote a limitation of quantity, but rather denote the presence of at least one of the referenced items. The modifier "about" used in connection with a quantity is inclusive of the stated value and has the meaning dictated by the context (e.g., includes the degree of error associated with measurement of the particular quantity). Furthermore, unless otherwise limited all ranges disclosed herein are inclusive and combinable (e.g., ranges of "up to about 25 weight percent (wt. %), more particularly about 5 wt. % to about 20 wt. % and even more particularly about 10 wt. % to about 15 wt. %" are inclusive of the endpoints and all intermediate values of the ranges, e.g., "about 5 wt. % to about 25 wt. %, about 5 wt. % to about 15 wt. %", etc.). The use of "about" in conjunction with a listing of items is applied to all of the listed items, and in conjunction with a range to both endpoints of the range. Finally, unless defined otherwise, technical and scientific terms used herein have the same meaning as is commonly understood by one of skill in the art to which this invention belongs. The suffix "(s)" as used herein is intended to include both the singular and the plural of the term that it modifies, thereby including one or more of that term (e.g., the metal(s) includes one or more metals). Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments.

It is to be understood that the use of "comprising" in conjunction with the components or elements described herein specifically discloses and includes the embodiments that "consist essentially of" the named components (i.e., contain the named components and no other components that significantly adversely affect the basic and novel features disclosed), and embodiments that "consist of" the named components (i.e., contain only the named components).

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. An electric vehicle, comprising:
   a vehicle chassis extending along a longitudinal axis and a rotatable vehicle drive axle disposed along a transverse axis and having opposed ends that are configured for attachment of a pair of opposed drive wheels; and
   a selectively movable electric propulsion motor comprising a rotatable motor shaft rotatable about a motor axis, the selectively movable electric propulsion motor configured to be mounted within the vehicle chassis and operatively coupled to the rotatable vehicle drive axle and the opposed drive wheels, the selectively movable electric propulsion motor and the motor axis configured to be oriented in a substantially vertical direction and movable with reference to the rotatable vehicle drive axle.

2. The electric vehicle of claim 1, further comprising a selectively movable differential disposed on the rotatable vehicle drive axle and configured to operatively couple motive power of the selectively movable electric propulsion motor that is transmitted to the rotatable motor shaft to the rotatable vehicle drive axle.

3. The electric vehicle of claim 2, wherein the selectively movable differential comprises a differential housing, a shaft gear attached to the rotatable motor shaft and disposed within the differential housing, and a drive axle gear attached to the rotatable vehicle drive axle and disposed within the differential housing, the shaft gear operatively coupled to the drive axle gear.

4. The electric vehicle of claim 1, further comprising a motor actuator operatively coupled to the selectively movable electric propulsion motor and the vehicle chassis, the motor actuator configured to selectively move the selectively movable electric propulsion motor and the motor axis from a first position comprising a first direction of the motor axis to a second position comprising a second direction of the motor axis, the second position being separated from the first position by an angle ($\alpha$).

5. The electric vehicle of claim 4, wherein the motor actuator is configured to selectively move the selectively movable electric propulsion motor and the motor axis while the electric vehicle is stationary or in motion from the first position comprising a first direction of the motor axis to the second position comprising the second direction of the motor axis, the second position being separated from the first position by the angle ($\alpha$).

6. The electric vehicle of claim 4, wherein the angle ($\alpha$) comprises an acute angle, a right angle, or an obtuse angle.

7. The electric vehicle of claim 4, wherein the angle ($\alpha$) opens forward of the rotatable vehicle drive axle, or rearward of the rotatable vehicle drive axle, or forward and rearward of the rotatable vehicle drive axle.

8. The electric vehicle of claim 4, wherein the first position corresponds to a motor start mode and the second position corresponds to a motor operation mode, wherein the angle ($\alpha$) comprises a horizontal vector and a vertical vector, and wherein the vertical vector in the motor start mode is less than the vertical vector in the motor operation mode.

9. The electric vehicle of claim 4, wherein the electric vehicle also comprises a vehicle suspension, and wherein the selectively movable electric propulsion motor is selectively movable from the first position to the second position to dampen an electric propulsion motor harmonic and/or a vehicle suspension harmonic.

10. The electric vehicle of claim 4, wherein the selectively movable electric propulsion motor is selectively movable from the first position to the second position as a function of a motor characteristic, a vehicle characteristic, a vehicle cabin characteristic, or an environmental characteristic.

11. The electric vehicle of claim 4, further comprising a selectively movable differential that comprises a housing, a shaft gear disposed within the housing and attached to the rotatable motor shaft, and a drive axle gear disposed within the housing and attached to the rotatable vehicle drive axle, the shaft gear operatively coupled to the drive axle gear, the selectively movable differential and the selectively movable electric propulsion motor movable from the first position to the second position.

12. The electric vehicle of claim 1, wherein the rotatable vehicle drive axle comprises a front axle, the pair of opposed drive wheels comprises a pair of opposed front drive wheels, and the electric vehicle comprises a front wheel drive vehicle; or the rotatable vehicle drive axle comprises a rear axle, the pair of opposed drive wheels comprises a pair of opposed rear drive wheels, and the electric vehicle comprises a rear wheel drive vehicle; or the selectively movable electric propulsion motor comprises a selectively movable front electric propulsion motor operatively coupled to the front rotatable vehicle drive axle configured for attachment of the pair of opposed front drive wheels and a selectively movable rear electric propulsion motor operatively coupled to the rear rotatable vehicle drive axle configured for attachment of the pair of opposed rear drive wheels, and the vehicle comprises an all-wheel drive vehicle.

13. The electric vehicle of claim 1, further comprising a suspension component configured for motion in a substantially vertical plane, and wherein the selectively movable electric propulsion motor is configured to provide a motor torque in a plane that is substantially orthogonal to the substantially vertical plane.

14. The electric vehicle of claim 1, further comprising a heat dissipator that extends along the motor axis.

15. The electric vehicle of claim 14, wherein the heat dissipator comprises an axially extending heat dissipator thatcomprises a primary heat removal portion that faces a vehicle front of the electric vehicle and is configured for air cooling from an airflow received from the vehicle front of the electric vehicle.

16. The electric vehicle of claim 15, wherein the airflow is directed within an air duct disposed within the vehicle chassis, the air duct extending from a front end proximate the vehicle front to a motor end proximate the selectively movable electric propulsion motor, the air duct comprising a vertically-extending section proximate the motor end to provide a vertically-extending airflow to the primary heat removal portion.

17. The electric vehicle of claim 16, further comprising a selectively openable and closable airflow shutter disposed proximate to and in fluid communication with the front end of the air duct and being configured to selectively control the airflow within the air duct.

18. A method of making an electric vehicle, comprising:
forming a vehicle chassis extending along a longitudinal axis and a rotatable vehicle drive axle disposed along a transverse axis and having opposed ends that are configured for attachment to a pair of opposed drive wheels; and
mounting a selectively movable electric propulsion motor within the vehicle chassis comprising a rotatable motor shaft rotatable about a motor axis, the selectively movable electric propulsion motor coupled to the rotatable vehicle drive axle and the opposed drive wheels, the motor axis configured to be oriented in a substantially vertical direction.

19. A method of using an electric vehicle, comprising:
forming an electric vehicle comprising a vehicle chassis extending along a longitudinal axis and a rotatable vehicle drive axle disposed along a transverse axis and having opposed ends that are configured for attachment to a pair of opposed drive wheels, and a selectively movable electric propulsion motor comprising a rotatable motor shaft rotatable about a motor axis, the selectively movable electric propulsion motor configured to be mounted within the vehicle chassis and operatively coupled to the rotatable vehicle drive axle and the opposed drive wheels, the motor axis configured to be oriented in a substantially vertical direction, the selectively movable electric propulsion motor and the motor axis also configured to be selectively movable while the electric vehicle is stationary or in motion from a first position comprising a first direction of the motor axis to a second position comprising a second direction of the motor axis, the second position being separated from the first position by an angle ($\alpha$); and
operating the electric vehicle and moving the selectively movable electric propulsion motor from the first position to the second position while the electric vehicle is operating.

20. The method of using the electric vehicle of claim 19, wherein the electric vehicle further comprises a vehicle suspension, and wherein the moving the selectively movable electric propulsion motor and the motor axis from the first position to the second position dampens an electric propulsion motor harmonic or a vehicle suspension harmonic.

* * * * *

UNITED STATES PATENT AND TRADEMARK OFFICE
CERTIFICATE OF CORRECTION

PATENT NO. : 11,560,053 B2
APPLICATION NO. : 16/591726
DATED : January 24, 2023
INVENTOR(S) : Geoffrey David Gaither et al.

It is certified that error appears in the above-identified patent and that said Letters Patent is hereby corrected as shown below:

In the Claims

Column 15, Claim 1, Line 5: delete "attachment of a pair" insert --attachment to a pair--.

Column 15, Claim 5, Line 5: delete "comprising a first direction" insert --comprising the first direction--.

Signed and Sealed this
Twenty-eighth Day of February, 2023

Katherine Kelly Vidal
*Director of the United States Patent and Trademark Office*